Dec. 13, 1927.
H. S. MOORE
COMPOSITE CANDY
Filed Sept. 23, 1922
1,652,789
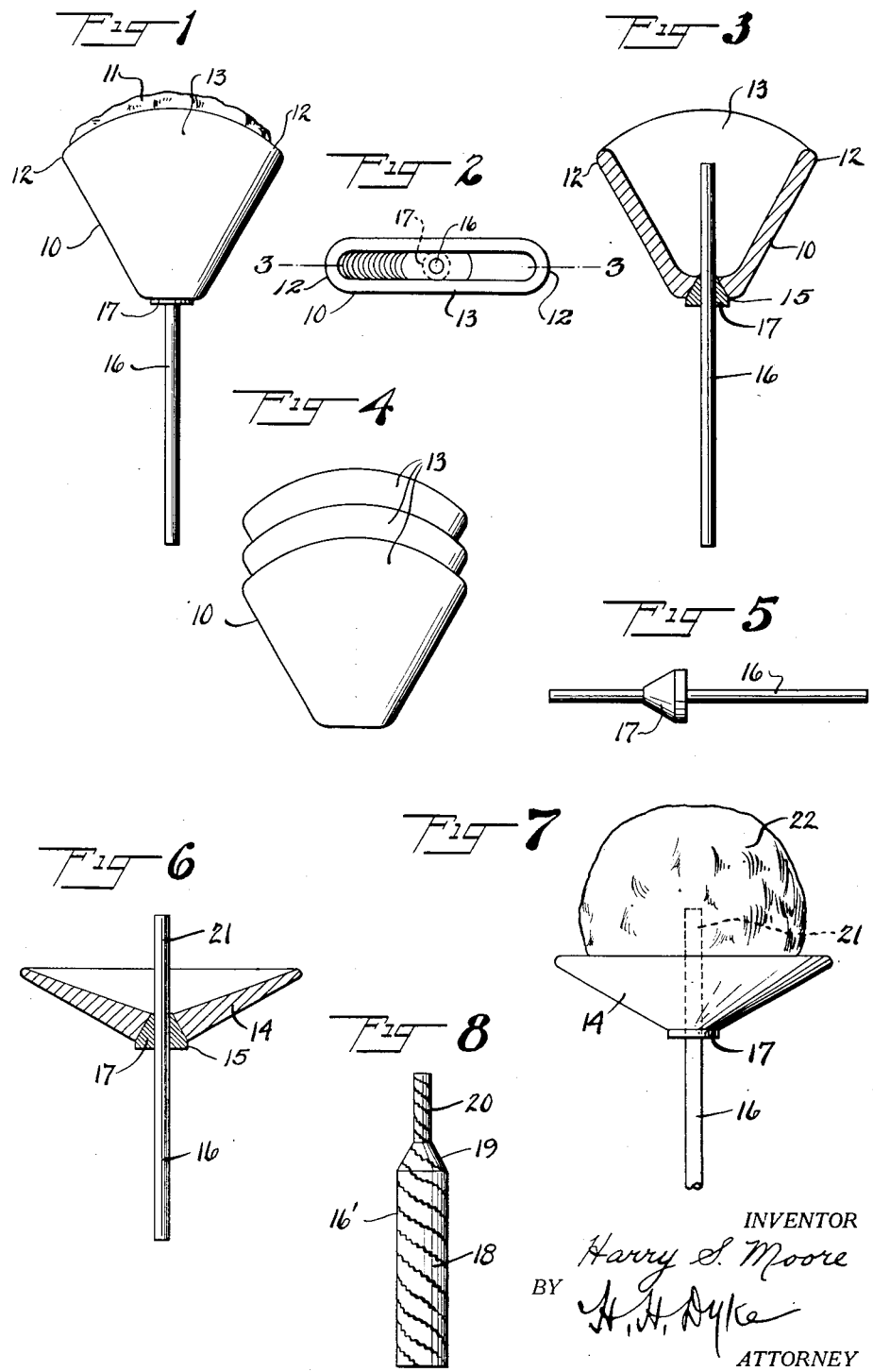
INVENTOR
Harry S. Moore
BY H. H. Dyke
ATTORNEY Patented Dec. 13, 1927.

1,652,789

UNITED STATES PATENT OFFICE.

HARRY S. MOORE, OF ATLANTIC CITY, NEW JERSEY, ASSIGNOR TO ARLINGTON MOORE, OF NEW YORK, N. Y.

COMPOSITE CANDY.

Application filed September 23, 1922. Serial No. 590,145.

My invention relates to a composite candy, and the embodiment thereof selected for illustration herein is similar to what is known in the trade as a "lolly-pop" or "sucker".

According to the present invention the candy portion is made of what is ordinarily termed "hard candy" or "pull candy", and the same is used to provide a receptacle or holder for edible refrigerated material, preferably ice cream, whereby the consumer obtains a pleasant combination flavored effect, different flavors being preferably chosen for the candy and the ice-cream or other edible refrigerated material.

In the manufacture of the ordinary lollypop as heretofore constructed, it has been customary to push the end of the stick into the mass of candy and to ship the completed article in this form. This involves numerous difficulties, loss of space in shipping and storage, breakage of the sticks in placing them into place in the candy, breakage of candy, and other related difficulties. According to the present invention, the stick provided for use with the candy and the candy itself are preferably so constructed as to enable the candy and the stick to be supplied separately, the stick being inserted in the candy by the vendor at the time of sale for consumption. In this way the candy can be shipped in compact space nested and the sticks supplied separately.

Also according to another feature of my invention the stick thus supplied separately is made of candy, affording an additional combination for suiting the user's taste.

I have selected certain embodiments of my invention for the purpose of illustration and for affording an understanding of the invention, but it is to be understood that the embodiments illustrated are for the purposes referred to above only and not for limitation of the invention.

In the drawings, Fig. 1 is a side view of a hollow lolly-pop having a filling of ice cream. Fig. 2 is a plan view of the article shown in Fig. 1, without the ice cream therein. Fig. 3 is a section on line 3—3, Fig. 2. Fig. 4 is a side view of a plurality of candy shells, such as shown in Figs. 1, 2 and 3, as same are nested together for shipping or storage. Fig. 5 is a side view of a stick portion of the article shown in Figs. 1-3. Fig. 6 is a view similar to Fig. 3, but showing a modified form of candy shell. Fig. 7 is a side view of the article shown in Fig. 6 with a ball of ice cream speared thereon, and Fig. 8 is a side view of a candy stick adapted to be used in place of the ordinary wooden stick.

By placing the ice cream or other frozen material in or on a candy shell with a stick to hold the shell, it becomes possible for the drip of the melting ice cream to be held and retained in the candy shell, thereby obviating any soiling, sticking or wetting of the fingers while the confection is being consumed. So long as this result is obtained, the shells may be of various shapes. I have shown in Figs. 1-3 a candy shell 10, which provides practically a receptacle for the frozen edible material, such as ice cream 11. It will be understood that in the claims where ice cream is referred to other refrigerated edible materials of similar character are included therewith. The hollow shell 10 of Fig. 1 is preferably of oval form in cross section, as shown in Fig. 2, being relatively narrow across the ends 12, 12 thereof, as compared with the greater width of sides 13.

This affords a convenient arrangement for the consumer drinking or sipping any liquid or partially liquid material from the cup or shell. In Figs. 6 and 7 I have shown shallow receptacles of saucer-like formation, designated by reference numeral 14, and it will be understood that various other shapes and forms of candy shells may be made use of when desired.

If a plain cylindrical stick be merely inserted through a hole in the bottom of the candy shell, as may be done within the scope of my invention, there may be more or less leakage. In order to prevent leakage and to secure universal fit of the sticks within the shells, I preferably make the hole 15 in the bottom of the shells of substantially conical form, with the larger end of the opening at the bottom of the shell, and provide a stick 16 with a conical sleeve or hub 17, which is adapted to fit in the opening 15 in the shell. It will be apparent that by making such tapered connection between the stick and shell there may be considerable variation in the size of openings 15 and hubs 17, but that notwithstanding such variation as there may be in this respect, the stick 16 with the hub 17 will fit sufficiently closely in the opening 15 to provide the necessary closure.

It will, of course, be apparent that the dampening of the candy, as by means of moisture from the ice cream coming into contact therewith, will serve to stick these parts together and to seal the opening around the stick against leakage.

The hub 17 of stick 16 may be formed in various ways and of various materials, but preferably same is made of a small piece of candy molded in place on the stick, and the stick is shipped with the molded candy hub 17 formed thereon at the time of manufacture.

Numerous modifications of the particular embodiments shown may be resorted to, as will be readily understood. For example, in Fig. 8 I have shown a candy stick 16' having a main shank portion 18 and a tapered conical portion 19 and a projecting portion 20 extending beyond the conical portion 19, which may be utilized as a support for the shell, instead of a stick of wood or other material, and if desired, the shank portion 18 of such candy stick may be wrapped with tissue paper or the like material, which may be retained in place thereon during the consuming of the shell and its contents, and when the consumer comes to finally eat the stick, this covering may be removed.

The stick may be extended upwardly beyond the bottom of the candy shell, if desired, or such upward extension may be dispensed with. In Fig. 3 I have shown the stick projecting upwardly for a portion of the height of the receptacle, whereas in Fig. 7 with the candy shell or apron 14, I have shown the stick having an upwardly projecting portion extending considerably higher than the top of the shell and used as a support for sticking or spearing a ball 22 of ice cream thereon. With this arrangement one can readily alternate between ice cream and candy, first taking a bite of ice cream and then a bite from the candy apron 14.

It will be seen that numerous advantages are secured by the present invention. Considering the invention merely from the lollypop or candy aspect, without reference to the filling of ice cream, ices or the like, it will be seen that the breakage of candy and of sticks resulting from thrusting the stick forcibly into the candy are avoided; the provision of the hub on the stick limits the extent to which the shell can slide downwardly on the stick; also there is a saving of space in shipping and storing the component parts separately.

Viewed from the standpoint of a composite confection, numerous additional features of advantages are presented. Combinations as high as three-fold of different tastes and flavors may be secured to suit the taste and whim of the user. The ice cream can be consumed without soiling the hands, and if the ice cream melts or partially melts, the fluid can be drunk or sipped from the receptacle. The device is completely sanitary, as the ice cream and candy are not combined until practically the time of consumption and various other features of advantage are secured, which need not be enumerated in detail.

I claim:

The combination with a candy shell conical in shape, whereby a series of them may be nested, and having a downwardly flaring hole in its bottom, of a stick having a substantially conical candy boss molded thereon, said stick being adapted to be inserted in the hole with the candy boss filling said opening.

In testimony whereof, I have signed my name hereto.

HARRY S. MOORE.